…

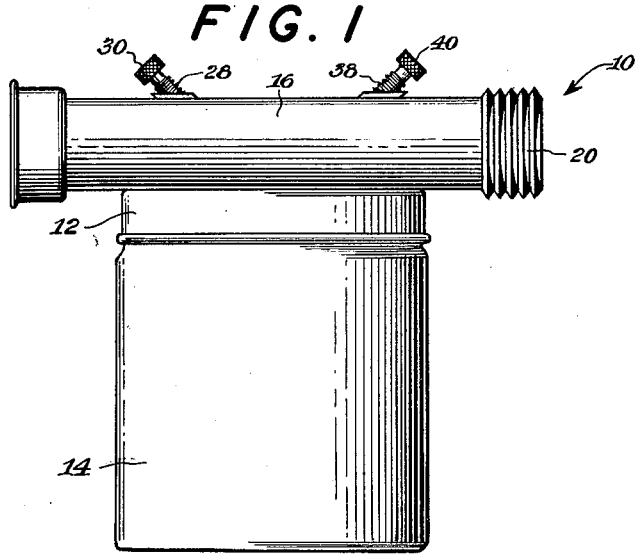
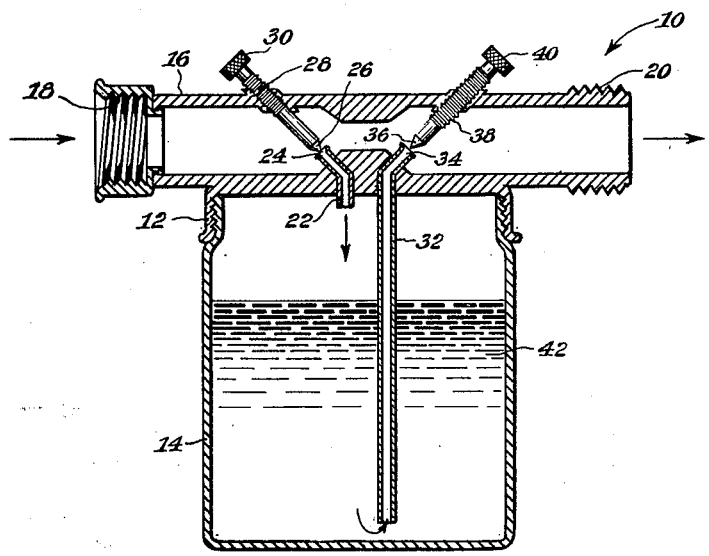

United States Patent Office 3,194,444
Patented July 13, 1965

3,194,444
DISPENSER FOR ENTRAINING AN ADDITIVE
INTO A STREAM OF WATER
George Hubert, P.O. Box 364, Norwalk, Calif.
Filed Oct. 30, 1964, Ser. No. 407,791
1 Claim. (Cl. 222—193)

This invention relates to dispensers and, more particularly, to a dispenser for adding a liquid additive to a stream of water.

An object of the present invention is to provide a device for attachment to a liquid supply line, such as a garden hose, which will automatically dispense a liquid additive from a receptacle carried thereby into the stream of water passing in proximity therewith.

Another object of the present invention is to provide an additive dispenser which can be conveniently mounted upon and removed from a conventional garden hose, which can be adjustably set to dispense various products, such as liquid fertilizer, into the stream of water for spraying upon flower beds, and the like.

A more specific object of the present invention is to provide an additive dispenser of the type described which can be used to dispense various types of liquid material, such as soap, fertilizer, detergent, insecticides, and the like in a stream of water delivered by a conventional garden hose, for facilitating various household tasks.

All of the foregoing and still further objects and advantages of this invention will become apparent from a study of the following specification, taken in connection with the accompanying drawing, wherein:

FIGURE 1 is a side elevational view of a liquid additive dispenser made in accordance with the present invention; and FIGURE 2 is a longitudinal cross sectional view of the device shown in FIGURE 1.

Referring now more in detail to the drawing, a dispenser assembly 10 made in accordance with the present invention is shown to include a main body portion 16 in the form of an elongated conduit having an integrally formed lid 12 for detachably supporting a receptacle 14, such as a metal glass container.

One end of the conduit portion 16 defines a water inlet having an internally threaded portion 18 for receiving the end of a garden hose threadedly therewithin. The opposite end of the conduit portion 16 defines a water outlet having an externally threaded portion 20 for directing a stream of water outwardly therethrough directly, or for insertion into an associated device, such as a spray nozzle, or the like.

Communicating between the interior of the conduit portion 16 and the lid 12, is an inlet valve assembly having a short duct 22 opening into the interior of the lid 12 at one end and an outwardly flared valve seat 24 at its opposite end communicating with the interior of the conduit 16. The flared end of the duct is directed angularly toward the water inlet end 18 of the conduit. An externally threaded plunger member 28 is threadedly carried by an upper portion of the conduit 16 and has a knurled knob 30 for adjusting the position of its opposite tapered end 26 relative to the flared opening 24 of the duct piece. By adjusting the distance between the terminal portion 26 of the plunger 28 and the flared seat 24 of the duct piece, the volume of water entering the duct piece 22 may be varied.

The assembly also includes an outlet valve assembly in the form of an elongated duct piece 32 communicating at one end with the bottom of the receptacle, 14, and having its upper end inclined into the interior of the conduit 16 toward the water outlet portion 20. Confronting the outwardly flared seat 34 of this duct piece 32, is the tapered terminal portion 36 of an externally threaded valve plunger that is threadedly carried upon an upper portion of the conduit member 16. This plunger 38 also includes a knurled knob 40 for adjusting the position of the terminal portion 36 relative to the seat 34.

In actual use, the interior of the receptacle 14 may be filled with a liquid 42 of any desired ingredients, such as fertilizer, insecticide, soap, or the like. This container 14 is threadedly carried by the cap portion 12 of the assembly for convenient filling, emptying, and cleaning. By adjusting the position of the inlet valve plunger 28, the quantity of water entering the duct piece 22 may be varied. The water entering the duct 22 thus pressurizes the contents 42 of the container 14, to force such contents outwardly through the elongated duct piece 32 of the outlet valve, and through the flared seat 34 into the liquid stream directed toward the water outlet 20. By adjusting the position of the plunger 38, the distance between the plunger terminal 36 and seat 34 may be varied to thus control the quantity of liquid entering the water stream from the interior of the receptacle 14.

It will thus be recognized that by varying the adjustments of the inlet and outlet valve plunger, a suitable balance may be achieved to ensure the proper rate of dispensing the contents 42 of the container 14 into the stream of water passing through the conduit portions 16 of the assembly.

It will also be recognized that this apparatus can be conveniently used for dispensing all types of liquids into a water stream for various household tasks. The unit includes a minimum number of parts, all of which can be readily cleaned, serviced and adjusted to meet all types of operating conditions. The various parts of the assembly can also be constructed of a variety of materials to meet special requirements.

While this invention has been described with particular reference to the construction shown in the drawing, it is to be understood that such is not to be construed as imparting limitations upon the invention, which is best defined by the claim appended hereto.

Having thus described my invention, I claim as new and desire to secure by Letters Patent:

A dispenser for entraining an additive into a stream of water comprising, in combination, an upwardly opening receptacle, a main body portion having a depending lid portion for detachable mounting upon the top of said receptacle and having a conduit portion defining a water inlet and a water outlet, an inlet valve communicating with said inlet of said conduit portion and the interior of said receptacle, and an outlet valve communicating with said outlet and the bottom of said receptacle, whereby a stream of water passing through said conduit pressurizes the interior of said receptacle through said inlet valve for the dispensing of contents from said container through said outlet valve into said stream of water, said conduit portion comprising a tubular member, said water inlet defining an internally threaded fitting for receiving a water hose fitting, said water outlet comprising an externally threaded terminal portion for supporting a spray nozzle thereupon, said inlet valve comprising a needle valve having an inlet and a manually adjustable control member inclined from said water inlet toward the interior of said receptacle, said inlet member defining an inlet opening and having an upwardly projecting portion in axial alignment with said control member, and said outlet valve comprising an outlet member and a manually adjustable control member inclined from said receptacle toward said water outlet, said outlet member defining an outlet opening and having an upwardly projecting portion in axial alignment with said respective control member.

References Cited by the Examiner

UNITED STATES PATENTS

| | | | |
|---|---|---|---|
| 2,302,799 | 11/42 | Peterson | 239—310 X |
| 2,536,361 | 1/51 | Flanders | 239—317 X |
| 3,060,956 | 10/62 | Menzie | 239—310 X |
| 3,099,394 | 7/63 | Lynn | 239—310 X |

LOUIS J. DEMBO, *Primary Examiner.*

EVERETT W. KIRBY, *Examiner.*